May 7, 1963 O. HAUGWITZ 3,088,690
WIRE COILING APPARATUS
Filed May 25, 1960 8 Sheets-Sheet 1

May 7, 1963   O. HAUGWITZ   3,088,690
WIRE COILING APPARATUS
Filed May 25, 1960   8 Sheets-Sheet 2

May 7, 1963   O. HAUGWITZ   3,088,690
WIRE COILING APPARATUS

Filed May 25, 1960   8 Sheets-Sheet 6

Fig. 7

May 7, 1963 O. HAUGWITZ 3,088,690
WIRE COILING APPARATUS
Filed May 25, 1960 8 Sheets-Sheet 7

May 7, 1963 O. HAUGWITZ 3,088,690
WIRE COILING APPARATUS
Filed May 25, 1960 8 Sheets-Sheet 8

United States Patent Office 3,088,690
Patented May 7, 1963

3,088,690
WIRE COILING APPARATUS
Otto Haugwitz, La Celle Saint-Cloud, France, assignor to Societe Anonyme Geoffroy-Delore, Paris, France, a French company
Filed May 25, 1960, Ser. No. 31,695
Claims priority, application France June 2, 1959
8 Claims. (Cl. 242—83)

The present invention relates to apparatus for continuously transforming filamentary material from a straight-line condition to the form of stacked turns or vice versa. The apparatus is designed to perfect or improve the known processes of receiving and starting filaments, which consist respectively either in causing stacked turns to drop on supports, said stacked turns being formed above these supports, or in removing from these supports the turns which have previously been placed therein. The filamentary material may be thread or wire and for convenience it will hereinafter be referred to as "wire."

As far as the usually employed receiving apparatus is concerned, the turns drop from a variable height which is a maximum when the support is empty and a minimum when it is filled.

However, it is very important that the turns be placed in a certain manner, and preferably be regularly stacked in honeycombed overlapping form in order that the turns may remain exactly in their order of arrival.

But the precision of placing the turns becomes less effective as the distance between the device which distributes the wire in stacked turns and the top of the stack increases.

As far as the thread starting apparatus are concerned, the distance between the top of the stack of turns of wire and the point through which the wire of the apparatus comes out varies also when the coils are unwound on untwisting, that is to say by pulling the wire in the direction of the axis of the turn. The swelling of the wire which is produced and which increases with the speed of pulling the wire and the value of this distance, may cause entanglements due to a component of force which tends to tighten the turns round their centre.

The present invention has for an object an apparatus for continuously winding or unwinding wire which enables, in the first instance, to obtain optimum conditions for the placing or removal of the wire, these conditions remaining always the same in the course of the unfolding of the operations which is of prime importance.

For this purpose, in a general manner, the process carried out by such an apparatus consists either in laying towards the bottom the wire in stacks of staggered turns on a support, or in taking out towards the top the wire stored in a stack of staggered turns on a support, and in lowering or raising respectively the stack of turns in such a manner that the distance separating the top of the stack from the point through which the placing or the drawing of the thread is effected, be maintained at a low constant value.

In the second instance, the invention has the joint purpose of enabling a continuous operation of the apparatus, that is to say that the latter is designed either to form without interruption as from a continuous thread in a straight line a succession of separate stacks of turns of wire which are regularly staggered, or to reel without interruption into a straight line continuous thread, a succession of separate stacks of regularly staggered turns of wire.

In order that the invention may be more readily understood, reference will now be made to the accompanying drawings, which show specific embodiments thereof by way of example and in which:

FIGURE 2 shows a plan of the rack of FIGURE 1, FIGURES 3a, 3a', 3b, 3b', 3c, 3c', 3d, 3e, 3e' and 3f show schematically successive stages of the operation of an apparatus according to the invention for drawing off the wire.

The procedure for winding on the wire in regularly stacked turns will be first explained, by reference to FIGURES 1a to 1e.

Figure 2:
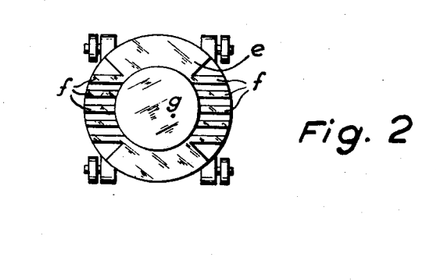

The circular turns which are formed in a device $a$, which may be of any known type, are distributed so that they regularly overlap in a honeycomb arrangement by means of a distributor device schematically shown at $b$ which is slowly rotated about a vertical axis. A temporary turns storer $c$ is disposed directly under the distributor $b$. A wire support $d$ comprises a plate $e$, which may be provided with feet and rollers and on which are fixed lateral wedges forming a rack $f$, as is shown in FIGURE 2, and a central cylinder $g$.

Figures 1A, 1B:
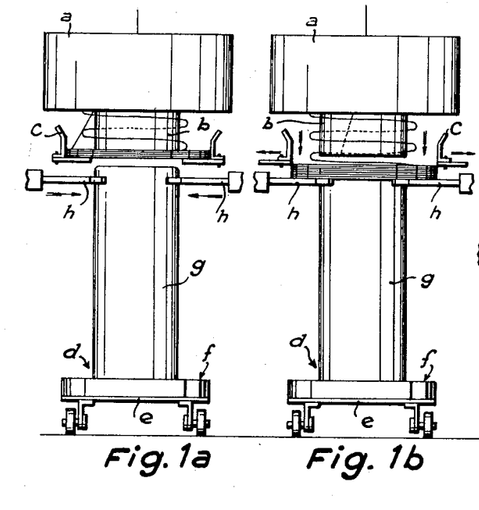
FIGURES 1a, 1b, 1c, 1d, and 1e show schematically five successive stages of operation of apparatus according to the invention for receiving and winding on wire on a bobbin.

When the winding apparatus is started the temporary storer $c$ is closed and the turns formed are retained therein (FIG. 1a). The support $d$ is placed under the receiving head in the extension of its axis.

Supports $h$ which are vertically movable are oppositely situated on each side of the wire support $d$, said supports having the form of combs which may be moved away horizontally one from another and may be moved together vertically. They are initially situated adjacent storer $c$ at a location near the central cylinder $g$ (FIG. 1a).

Figure 1C:
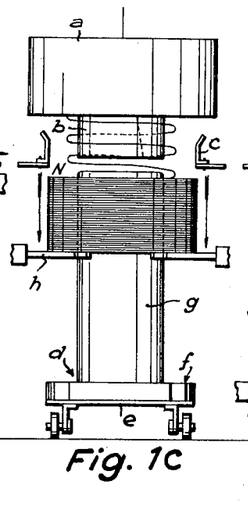

The temporary storer $c$ is then opened (FIG. 1b). The turns already deposited in the storer $c$ fall from a very small height onto the teeth of the combs $h$ which then start to descend as the turns are deposited thereon. The speed of descent of the combs $h$ is regulated in such a manner that the turns always arrive at a substantially constant level N (FIG. 1c).

Figures 1D, 1E:
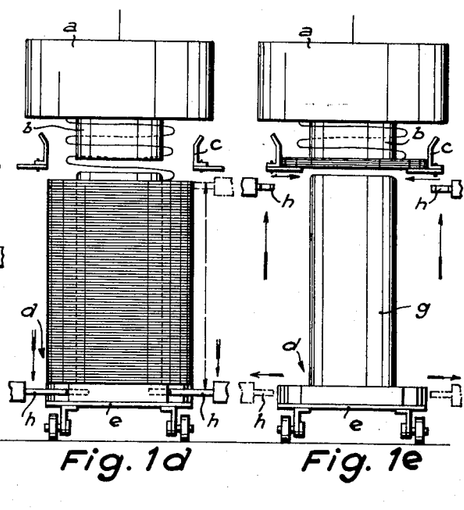

When the combs $h$ reach a position adjacent plate $e$, the teeth of the combs $h$ pass through the interstices of the rack $f$ and the whole stack of turns is then supported on the rack $f$, so as to free the teeth of the combs (FIG. 1d).

The storer $c$ is then again closed (FIG. 1e) and the combs $h$ are moved apart and moved upwardly again as is indicated by the arrows in FIG. 1e whilst the support $d$ with the stack of turns thereon is laterally displaced and replaced by an empty support $d$.

The combs $h$ are again drawn close to the central cylinder $g$ and a new winding cycle is commenced.

Figure 3A:
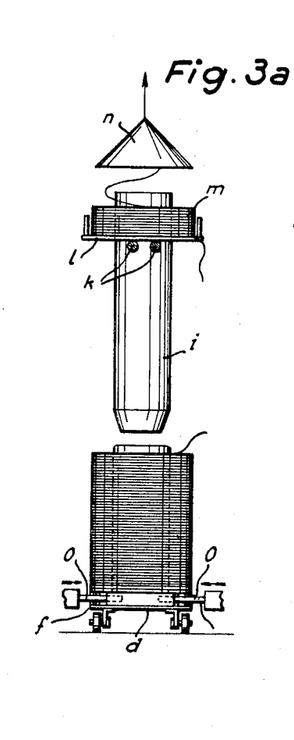
Figures 3A, 3B:
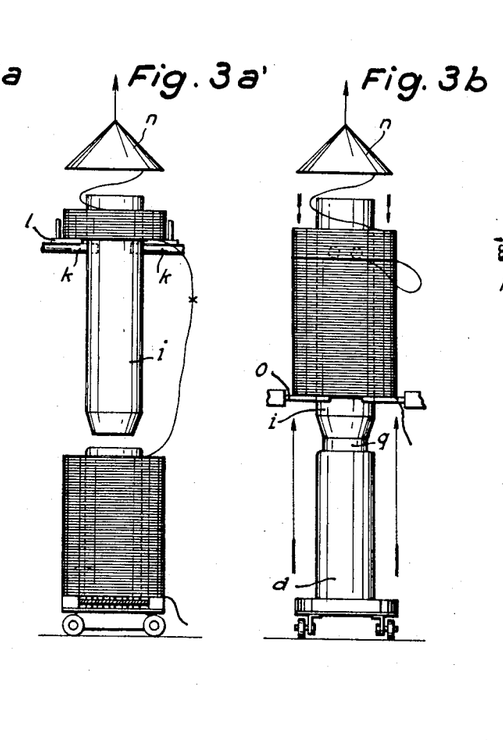
Figure 3B:
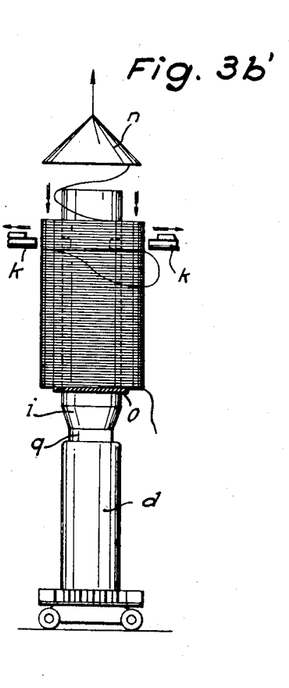

It shall now be explained how a continuous start of stacked turns of wire resting on a support is effected, by reference to FIGS. 3a, 3a', 3b, 3b' etc. In these figures, the letters $a$, $b$, etc. indicating the successive stages of operation of the apparatus and the primed figures are side views of the respective elements shown in the corresponding unprimed figures.

Above a wire support $d$ similar to that used in the winding operation, is situated a cylinder $i$ the lower part of which is conical, which cylinder is suspended on rods $k$ at the upper part thereof (FIG. 3a). Above these rods are situated segments $l$ which carry wire which is being passed through the cone $n$. The lower end of the length of wire on the segment $l$ is joined to the upper end of a length of wire supported on support $d$ (FIG. 3a').

Detachable comb supports $o$ which are identical to those of the apparatus used in the winding on arrangement, are perpendicular to the segments $l$, and are adapted to move vertically and pass between the wedges of rack $f$ of the wire support.

Comb supports $o$ engage the stack of turns and rapidly raise the same (as shown by the arrows in FIG. 3b), until the top of the stack of turns reaches the segments $l$ which are then instantaneously withdrawn.

The rods $k$ carrying the cylinder $i$ are also withdrawn with the segments $l$. This movement of rods $k$ causes a cylinder $q$ to be projected from the bottom of the cylinder $i$ such that cylinder $q$ rests on the wire support $d$. The wire which was supported above the segments then falls through a small distance and onto the stack of wire which is supported on comb $o$.

Figure 3C:
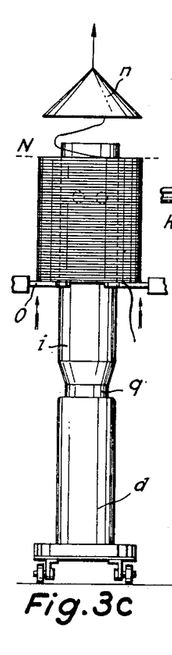
Figure 3D:
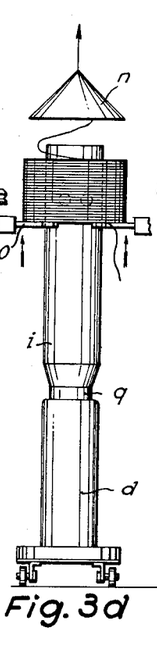

The supports then rise (FIGS. 3c, 3c', and 3d) with a speed such that the starting level N does not vary significantly. The speed of rising will be for example regulated so as to be slightly higher than the speed which is just necessary to maintain equilibrium between the unwinding and the upward movement and a detector will stop the operation of the means causing the rising of the stack of turns when the stack rises too high. The latter means is then started again when the level of the stack has dropped a predetermined amount. The same system may serve to control the descent of the stack of turns when the coiled wire is being wound on.

Figure 3E:
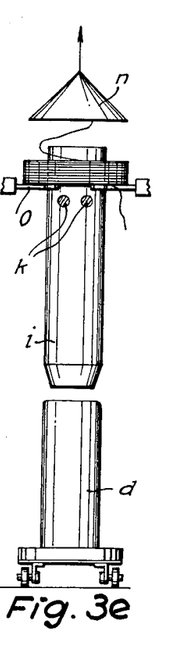

When the comb supports $o$ have gone beyond the level where the segments $l$ are to be returned into place (FIGS. 3e and 3e'), the latter as well as the rods $k$ advance, said rods causing the supporting cylinder $q$ to be retracted.

Figure 3F:
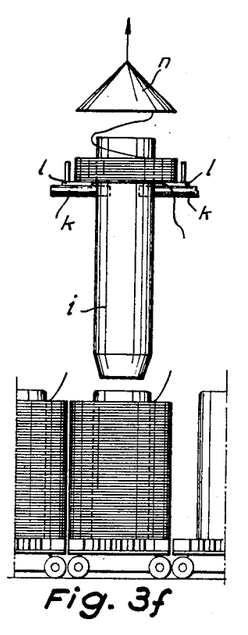

The empty support $d$ may then be exchanged for a full one (FIG. 3f) and a new cycle of starting the wire begins.

Figure 4:
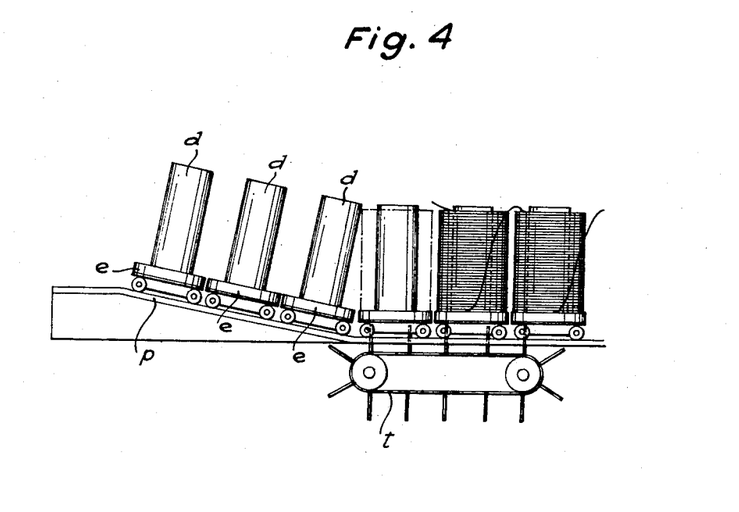
FIGURE 4 is a side view of an auxiliary device for successively replacing wire bobbins.

All the movements necessary for the operations of the apparatus described above may be automatically released and controlled. The supports $d$ carrying the wires may be mounted on rollers and the wire may be advanced on conveyor lines or by rollers so that the supports and wire advance together under the receiving or starting frame. The supports may be driven by a chain, a compressed air piston or any other suitable means. The supports $d$ may be placed on an inclined plane $p$ and in which case they advance automatically under the influence of gravity when a support advances from a position under the control of a chain $t$ provided with fingers, as is shown in FIGURE 4.

It is not necessary to cut the wire between succeeding supports. Whole series of supports may thus serve to directly feed great lengths to other machines without having any joint between the different lengths, starting with the support which was filled last.

In order to carry out the processes of reception and winding on and drawing off which was mentioned in general in the preceding text, the following arrangements which will now be described, may for example be used.

Figure 5:
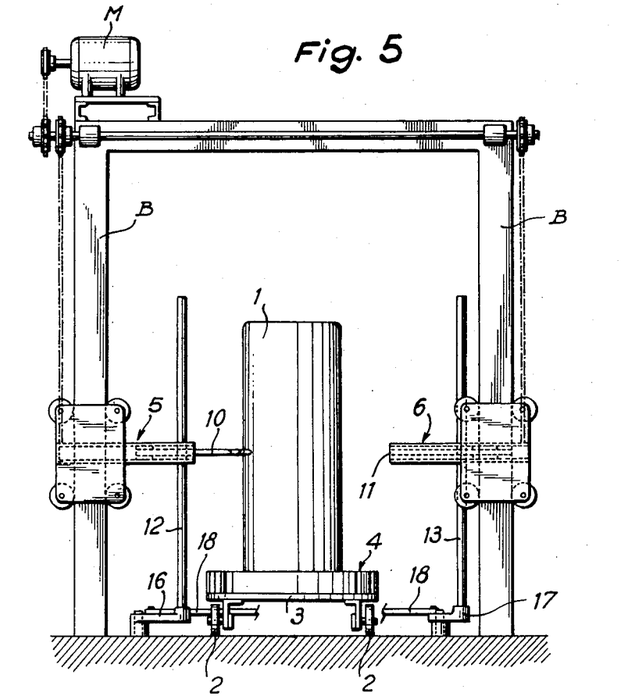
FIGURE 5 is an elevation of a part of the apparatus according to the invention for receiving and winding on or for drawing off the wire.
Figure 6:
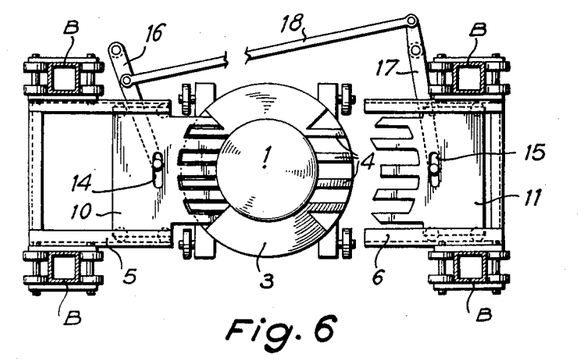
FIGURE 6 is a plan view of the element of FIGURE 5.

FIGURES 5 and 6 show a device which may be used for receiving or drawing off the wire. A wire supporting and conveying member 1 mounted on rollers 2 has a bottom 3 provided with wedges 4 forming a rack on two opposite sectors of about 90° angular extent. The racks are oriented so as to be perpendicular to the direction of displacement of the supports. The two other sectors of the bottom are continuous as is shown in FIGURE 6.

Two horizontal frames 5 and 6 are adapted to slide vertically simultaneously and are guided by rollers on the legs of a framework B of the receiving or starting apparatus, and their displacement is controlled by a motor M fixed on the framework B, by means of pinions and chains.

Two vertically movable supports having the shape of combs 10 and 11 are adapted to slide horizontally in the frames 5 and 6, the teeth of said combs corresponding, with a small amount of play, to the interstices between the rack 4 of the bottom 3 of the thread support 1. The ends of the teeth of the combs are pointed in order that they may be introduced easily between the elements of rack 4. FIGURES 5 and 6 show on the left hand side the teeth in the engaged position, and on the right hand side the teeth in the withdrawn position.

The two combs 10 and 11 are simultaneously controlled by vertical rods 12 and 13 which pass through holes 14 and 15 in the frames 5 and 6 and which are, on the other hand, fixed to two cranks 16 and 17 connected by a connecting rod 18. Obviously the teeth of the combs 10 and 11 are simultaneously either retracted out of or projected into the gaps between the rack in accordance with the position of the connecting rod 18 controlled by any suitable driving member.

It is possible in theory to use known receiving heads for forming the circular turns of wire. However, in these, the device for distributing the wire in regularly overlapping stacked turns requires a minimum distance between the head for a winch and the positioned turn. In order to reduce this undesirable distance, which is absolutely necessary when it is desired to receive thread at very great speeds, it is possible to use a receiving apparatus having no distributing device, whilst imparting a rotation to the whole head.

Figure 7:
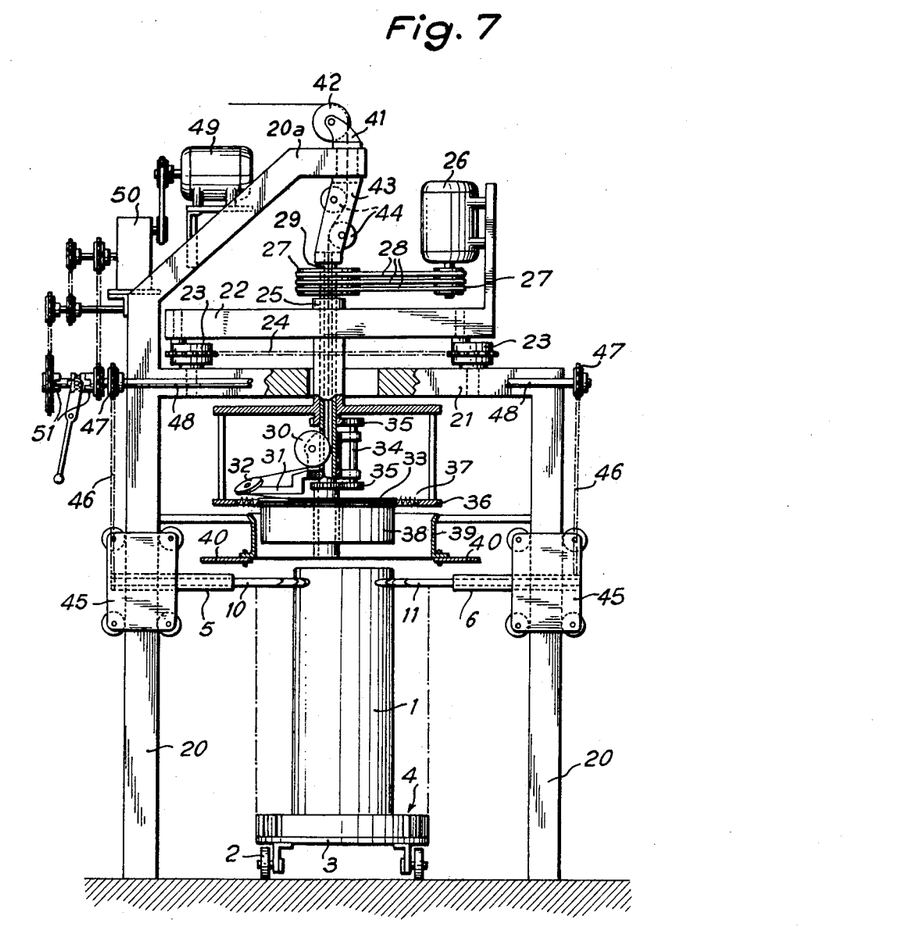
FIGURE 7 shows in elevation a particular embodiment of a device transforming continuous thread into regularly stacked turns which may be used with the part of the apparatus shown in FIGURES 5 and 6.

FIGURE 7 shows the details of such a receiving post. The receiving post is composed of a framework 20 in the form of a gantry for example carrying at the top a plate 21. Another plate 22 is situated above the latter, said plate 22 being connected to the first by at least three cranks 23 connected together by a chain 24. The upper plate 22 carries bearings 25 at its center for the head itself, and the motor 26 which drives it by means of pulleys 27 and belts 28.

A hollow shaft 29 carries at the bottom a pulley 30 and an arm 31 on which is fixed a pulley 32 which guides the wire in such a manner that it is wound on a winch 33 which is immobilized in space by an intermediary shaft 34 by means of spur gears 35.

A crown 36 carrying springs 37 which tighten the last turns of the wire against the winch 33 and prevent them from sliding, is suspended from the plate 22 carrying the head proper and thus follows the movement of the axis of the device.

The winch 33 is extended towards the bottom by a cylinder 38 having a diameter which is slightly smaller than that of the winch. Externally, this cylinder is surrounded by a cylinder 39 which is integral with the framework 20 and which has a diameter which corresponds to that of the stack of wire placed on the support. The external cylinder 39 carries at its base a device having laminations 40, of known type, which enables it to be closed at the bottom instantaneously and which thus forms a temporary turns storer.

A support 41 which is mounted on an upper extension 20a of the framework 20 carries an orientable pulley 42 for leading in the wire. A cradle 43 carrying two pulleys 44 is situated between the entry of the shaft 29 and the support 41, said pulleys following the slow rotation of the shaft 29 of the head about the central axis of the apparatus.

The chain 24 which connects the cranks 23 carrying the upper plate is driven by a reducing gear, not shown from the shaft 29, or also by an auxiliary motor with a slow speed in order to obtain the desired regular overlapping stacking of the turns of wire.

Carriages 45, which slide vertically on the legs of the framework 20 carry the supports 5 and 6 of the combs 10 and 11. The two supports 45 are suspended on chains 46 which pass over upper pinions 47 which are connected by a shaft 48, said pinions being driven by a motor 49, a variable-speed reducing gear 50 and two dog-clutches 51 for driving in two directions and at different speeds.

Figure 8:
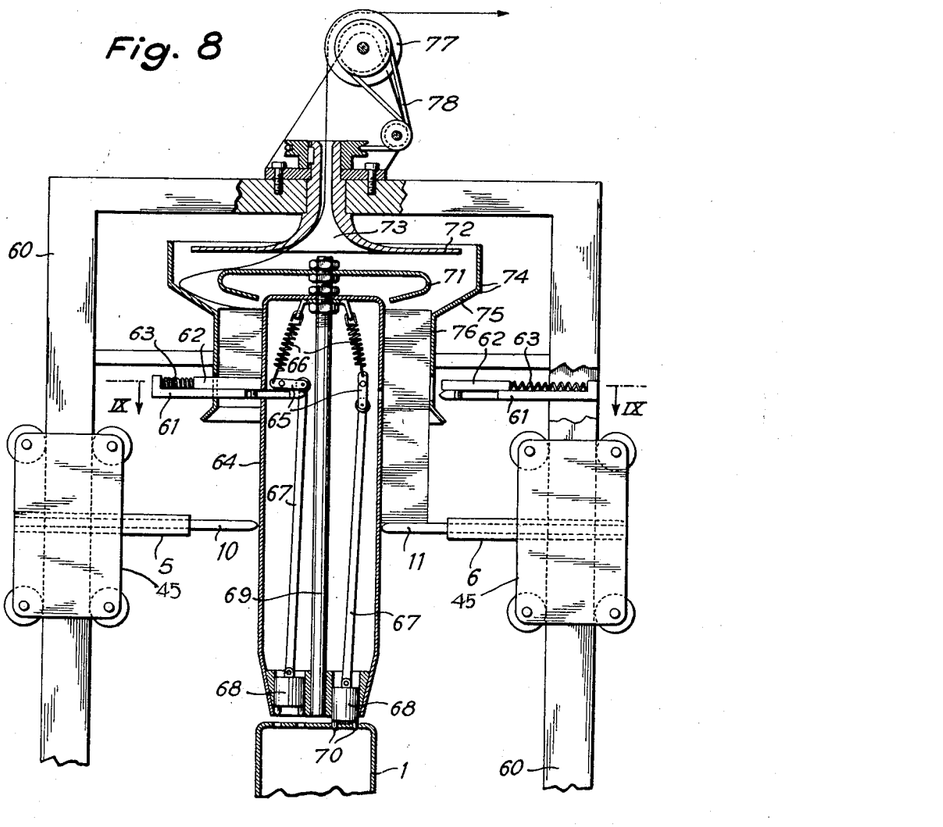
FIGURE 8 is an elevation of a device transforming a stack of stacked turns of wire into a straight line which may be used in order to draw out the wire.
Figure 9:
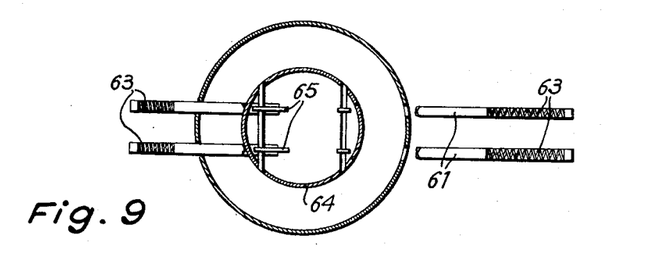
FIGURE 9 is a partial view in section along the line IX—IX of FIGURE 8.

Reference will now be made to FIGURES 8 and 9 which show a wire starting device which is particularly adapted to effect starting or winding on according to the invention.

The starting device comprises a framework 60, and comb supports 5 and 6 which are adapted for sliding vertically on the legs of the framework. At the top and in a fixed position in a plane which is perpendicular to the legs, are two rods 61 which are situated on each side. These rods are disposed below the supports 62 the latter being in the shape of full segments of 90° corresponding to the filled part of a wire support such as described above. The supports 62 are connected to the rods 61 by springs 63.

When the rods 61 advance, which happens when the combs 10 and 11 are mounted above the rods 61 as has been explained above with respect to FIG. 3e, the supports 62 rest against the internal cylinder 64 which is situated in the center (see left hand side of FIGS. 8 and 9). The rods continue to advance and pass into apertures of the cylinder 64. At the end of their stroke they move away the levers 65 disposed inside the cylinder, and which, normally, are maintained vertically by springs 66. The levers 65 are, at the other end connected by connecting rods 67 to cylinders 68 which slide vertically on a central rod 69.

When the rod 61 moves the lever 65 away, the cylinders 68 are retracted at the same time. The cylinder 64 is then carried by the rods 61 to the top. In the vertical rest position of the levers 65, the cylinders 68 are drawn out and carry the cylinder 64 whilst resting on the top of the wire support 1 disposed thereunder (see right hand side of FIGS. 8 and 9). Teeth 70 which pass into apertures of the support 1 prevent the cylinder 64 from rotating, thus positively ensuring a correct orientation for the apertures of the top of the cylinder through which pass the rods 61.

At the upper part of the cylinder 64 there is a structural assembly constituting a starting head. This includes a freely mounted cap 71, a plate 72 situated above the cap, at a relatively small distance, said plate having a trumpet-shaped passage 73 which can also rotate about its axis. The whole assembly is surrounded by an anti-ballooning cylinder 74 which, through a conical part 75, is connected to a cylindrical part 76, the diameter of which is slightly greater than the diameter of the stack of wire turns and whose lower end is conical.

This cylinder 76 guides and centers the upper part of the stack of turns with the internal cylinder 64.

Holes arranged in the cylinder 76 enable the rods 61 and the segments 62 to draw closer and enable the comb supports 5 and 6 to rise up to their end of stroke.

The plate 72 may also be driven in rotation by the thread itself by means of a pulley 77 and a belt 78, in order completely to untwist the wire, and remove any constraint from the wire at the moment when the turn is removed. Moreover, the friction of the thread drives the cap 71.

Figure 10:
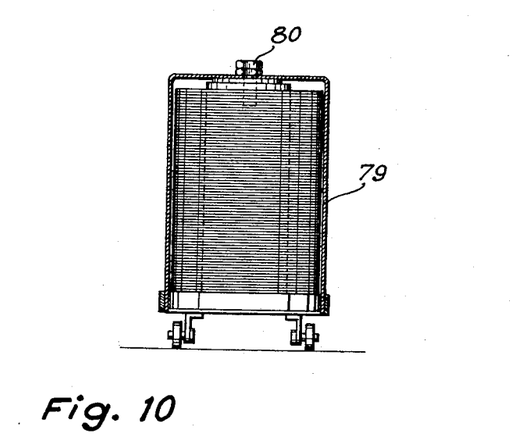
FIGURE 10 shows in section a bobbin filled with wire and provided with a cover and which may be handled in that state.

As is shown in FIGURE 10, the full wire supports may be covered over for conveyance by drums 79 which are placed upside down on the support and compress the stacks of turns. These protection drums 79 may be locked by means of a screw and nut 80 in the center, or any other suitable means.

What is claimed is:

1. Apparatus for selectively and continuously manipulating filamentary material transformed between straight line and stacked turns conditions, the apparatus comprising: means for transforming material between straight line and turned condition, a temporary turns storer including a horizontal supporting surface adapted for being located a small vertical distance beneath the first said means, means for causing movement of said supporting surface to release turns of material thereon, a vertically movable support for selectively raising and lowering a stack of regularly staggered turns of filamentary material to maintain the top of the stack at a small distance beneath the first said means, and means for moving said stack towards and away from the vertically movable support.

2. Apparatus as claimed in claim 1, in which the means for transforming the filamentary material is adapted to form the material into circular turns and is mounted so as to have a slow circular movement.

3. Apparatus as claimed in claim 1, in which said means for transforming the filamentary material is a starting head which is mounted round an internal cylinder said internal cylinder being in a first condition suspended at its upper part by rods, said rods being radially movable on a framework and entering into recesses provided in said internal cylinder, and said internal cylinder being in a second condition placed with its lower part on a central cylinder of a filament support, said internal and central cylinders being assembled together by members whose placing is controlled by the withdrawal of the said movable rods.

4. Apparatus as claimed in claim 3, in which the starting head comprises a cap loosely mounted on said internal cylinder, a rotating plate having a trumpet-shaped outlet aperture means for positioning said plate a small distance above said cap, cylindrical parts for preventing the swelling of the thread and for centering the stack of turns and means for positioning said cylindrical parts around said cap, said rotating plate and the upper part of said internal cylinder.

5. An apparatus according to claim 1 in which a constant height is maintained between the vertically movable support and the device for transferring the material between the two conditions.

6. Apparatus as claimed in claim 1, in which the means for transforming the filamentary material is adapted to distribute the material into circular turns, comprising a framework, a plate for supporting said device for manipulating the filamentary material, and means connecting said plate to said framework for imparting controlled circular movement to said plate.

7. Apparatus as claimed in claim 1, in which said means for transforming the filamentary material includes:

an internal cylinder having an upper part including apertures and a lower part, a framework, a plurality of rods radially movable with respect to said internal cylinder on said framework, means for causing said rods to enter said apertures for suspending said internal cylinder in a first condition and for withdrawing said rods from said apertures; a central filament support cylinder for contacting the lower part of said internal cylinder, and means responsive to the withdrawal of said rods from said apertures for assembling said cylinders together in a second condition; and a starting head mounted round said internal cylinder.

8. Apparatus as claimed in claim 1 wherein the means for moving said stack towards and away from said support comprises a support plate and a protecting drum, detachably covering said support plate.

References Cited in the file of this patent

UNITED STATES PATENTS

| | | |
|---|---|---|
| 2,703,686 | Bell | Mar. 8, 1955 |
| 2,929,574 | Henning | Mar. 22, 1960 |